US012750167B2

(12) United States Patent
Zhao et al.

(10) Patent No.: US 12,750,167 B2
(45) Date of Patent: Sep. 29, 2026

(54) METHOD FOR SIDELINK MONITORING AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 671 days.

(21) Appl. No.: 17/516,648

(22) Filed: Nov. 1, 2021

(65) Prior Publication Data

US 2022/0060289 A1 Feb. 24, 2022

Related U.S. Application Data

(63) Continuation of application No. PCT/CN2019/086913, filed on May 14, 2019.

(51) Int. Cl.
*H04L 1/1829* (2023.01)
*H04L 1/1812* (2023.01)
*H04W 4/40* (2018.01)

(52) U.S. Cl.
CPC .......... *H04L 1/1854* (2013.01); *H04L 1/1812* (2013.01); *H04W 4/40* (2018.02)

(58) Field of Classification Search
CPC ..... H04W 72/23; H04W 72/04; H04W 16/14; H04W 72/21; H04W 88/06; H04W 76/15; H04W 72/12; H04W 28/18; H04W 72/0446; H04W 48/12; H04W 76/10; H04W 8/24; H04W 72/53
See application file for complete search history.

(56) References Cited

U.S. PATENT DOCUMENTS

2013/0286853 A1 10/2013 Shi et al.
2018/0007605 A1* 1/2018 Eriksson .............. H04W 24/10
(Continued)

FOREIGN PATENT DOCUMENTS

CN 106664700 5/2017
CN 107210826 9/2017
(Continued)

OTHER PUBLICATIONS

ISDEC, Office Action for CA Application No. 3139544, Oct. 23, 2023.
(Continued)

*Primary Examiner* — Khalid W Shaheed
(74) *Attorney, Agent, or Firm* — Hodgson Russ LLP

(57) ABSTRACT

Provided are a method for sidelink (SL) monitoring, a terminal device, and a non-transitory computer readable storage medium. A first terminal device detects SL data transmitted by a second terminal device in a first duration, the SL data comprises one of: at least one of a reference signal and a SL control channel, or hybrid automatic repeat request (HARQ) feedback information. The first terminal device determines whether a SL between the first terminal device and the second terminal device is in an in-sync state or an out-of-sync state, according to a result of the detecting.

16 Claims, 5 Drawing Sheets

(56) References Cited

U.S. PATENT DOCUMENTS

| | | | | |
|---|---|---|---|---|
| 2020/0252989 | A1* | 8/2020 | Chen | H04W 24/08 |
| 2022/0150730 | A1* | 5/2022 | Freda | H04W 24/04 |

FOREIGN PATENT DOCUMENTS

| | | | | |
|---|---|---|---|---|
| CN | 107466446 | | 12/2017 | |
| CN | 107690129 | | 2/2018 | |
| CN | 108781423 | | 11/2018 | |
| CN | 109309928 | | 2/2019 | |
| CN | 109565793 | | 4/2019 | |
| CN | 109565833 | | 4/2019 | |
| EP | 3142397 | | 3/2017 | |
| EP | 3301978 | | 4/2018 | |
| EP | 3481106 | A1 | 5/2019 | |
| WO | WO-2011155754 | A2 * | 12/2011 | H04L 1/1607 |
| WO | 2015170723 | | 11/2015 | |
| WO | 2016122232 | | 8/2016 | |
| WO | 2018030007 | | 2/2018 | |

OTHER PUBLICATIONS

OPPO, "Physical layer procedure for NR-V2X sidelink," 3GPP TSG RAN WG1 #97, R1-1906475, May 2019.
EPO, Summons to attend oral proceedings for EP Application No. 19928445.6, Dec. 12, 2023.
Huawei et al, "Sidelink Measurements", 3GPP TSG RAN WG1 meeting #96bis, Apr. 8, 2019, R1-1904692, China.
Samsung, "Consideration on Sidelink RLM", 3GPP TSG RAN WG1 #96, Feb. 25, 2019, R1-1902281, Greece.
ZTE, "Initial Consideration on NR V2X Resource Allocation", 3GPP TSG RAN WG2 #103bis, Oct. 8, 2018, R2-1814168, China.
EPO, Extended European Search Report for EP 19928445.6, Mar. 4, 2022.
IPI, First Examination Report for IN Appl. No. 202117050029 dated Mar. 15, 2022.
Mediatek Inc., "RLF in sidelink, " 3GPP TSG-RAN WG2 Meeting #106, R2-1906341, May 2019.
EPO, Communication for EP Application No. 19928445.6, Feb. 7, 2023.
CIPO, Office Action for CA Application No. 3139544, Dec. 21, 2022.
ZTE Corporation et al., "Consideration on sidelink RLM management," 3GPP TSG RAN WG2 Meeting #106, R2-1906477, May 2019.
CNIPA, First Office Action for CN Application No. 202111217527.6, Jan. 19, 2023.
"3rd Generation Partnership Project; Technical Specification Group Radio Access Network; NR; Study on NR Vehicle-to-Everything (V2X) (Release 16)," 3GPP TR 38.885, Mar. 2019, v16.0.0.
Interdigital Inc., "RLM/RLF for NR V2X," 3GPP RAN WG2 Meeting #106, R2-1906387, May 2019.
EPO, Communication for EP Application No. 19928445.6, Aug. 29, 2022.
Samsung et al., "On Sidelink RLM," 3GPP TSG RAN WG1 #96bis, R1-1904430, Apr. 2019.
OPPO, "Discussion of RLM for Unicast," 3GPP TSG RAN WG1 #97, R1-1906476, May 2019.
ILPO, Office Action for IL Application No. 287771, Dec. 20, 2023.
JPO, Office Action for JP Application No. 2021-566343, May 16, 2023.
EPO, Communication for EP Application No. 19928445.6, Jul. 10, 2023.
IPI, Hearing Notice for IN Application No. 202117050029, Sep. 10, 2024.
JPO, Office Action for JP Application No. 2023-171648, Aug. 20, 2024.
ILPO, Office Action for IL Application No. 287771, Nov. 3, 2024.
KIPO, Office Action for KR Application No. 10-2021-7037094, Apr. 30, 2025.
EPO, Extended European Search Report for EP Application No. 24222524.1, Apr. 9, 2025.
WIPO, International Search Report for PCT/CN2019/086913, Feb. 11, 2020.
Vivo, "Discussion on RLM in NR sidelink," 3GPP TSG RAN WG1 Meeting #97, R1-1906145, May 2019, 4 pages.
CATT, "Radio link monitoring of sidelink unicast communication," 3GPP TSG RAN WG1 Meeting #97, R1-1906322, May 2019, 2 pages.
Mediatek Inc., "Discussion on SL RLM," 3GPP TSG RAN WG1 #97, R1-1906560, May 2019, 5 pages.
Samsung et al., "On Sidelink RLM/RLF," 3GPP TSG RAN WG1 #97, R1-1906945, May 2019, 3 pages.
LG Electronics, "Discussion on AS level link management for unicast," 3GPP TSG RAN WG1 #97, R1-1907021, May 2019, 3 pages.
Interdigital, Inc., "On Sidelink RLM/RLF for NR V2X," 3GPP TSG RAN WG1 #97, R1-1907100, May 2019, 3 pages.
Ericsson, "On SL RLM / RLF in Nr V2X for unicast," 3GPP TSG-RAN WG1 Meeting #97, R1-1907146, May 2019, 3 pages.
Huawei et al., "On RLM and RLF in NR V2X," 3GPP TSG RAN WG1 Meeting #97, R1-1907494, May 2019, 3 pages.

* cited by examiner

METHOD FOR SIDELINK MONITORING AND TERMINAL DEVICE

CROSS REFERENCE TO RELATED APPLICATION(S)

This application is a continuation of International Application No. PCT/CN2019/086913, filed on May 14, 2019, the entire disclosure of which is incorporated herein by reference.

TECHNICAL FIELD

This disclosure relates to the field of communication, and more particularly to methods and devices for sidelink (SL) monitoring.

BACKGROUND

Internet of vehicles (IoV) (also referred to as vehicle to everything (V2X)) communication adopts a device to device (D2D)-based sidelink (SL) transmission technology. Different from a traditional long term evolution (LTE) system in which data are received or sent via a base station, an IoV system adopts a direct terminal-to-terminal communication, and therefore has a higher spectrum efficiency and lower transmission delay.

In $5^{th}$ generation (5G) (that is, new radio (NR)) V2X (NR-V2X) communication, a terminal device can measure a reference signal and determine the quality of the SL according to a measurement result. In NR-V2X, the reference signal may be transmitted non-periodically, and the resources for the terminal device to transmit the reference signal need to be obtained through competition, which leads to the uncertainty of the transmission of the reference signal. Therefore, how to monitor the quality of SL has become a problem to be solved.

SUMMARY

According to a first aspect, a method for SL monitoring is provided. A first terminal device detects SL data transmitted by a second terminal device in a first duration, the SL data comprises one of: at least one of a reference signal and a SL control channel, or hybrid automatic repeat request (HARD) feedback information. The first terminal device determines whether a SL between the first terminal device and the second terminal device is in an in-sync state or an out-of-sync state, according to a result of the detecting.

indicating According to a second aspect, a terminal device is provided. The terminal device includes a memory and a processor. The memory is configured to store computer programs. The processor is configured to invoke and run the computer programs stored in the memory to perform the method of the first aspect or implementations of the first aspect.

According to a third aspect, a non-transitory computer readable storage medium is provided. The computer readable storage medium is configured to store computer programs which are operable with a computer to perform the method of the first aspect or implementations of the first aspect.

Indicating

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following will describe technical solutions of implementations with reference to the accompanying drawings.

The technical solutions of implementations are applicable to various communication systems, for example, a global system of mobile communication (GSM), a code division multiple access (CDMA) system, a wideband code division multiple access (WCDMA) system, an LTE system, an LTE frequency division duplex (LTE-FDD) system, an LTE time division duplex (LTE-TDD) system, an advanced long term evolution (LTE-A) system, a new radio (NR) system, evolved system of NR system, an LTE-based access to unlicensed spectrum (LTE-U) system, a NR-based access to unlicensed spectrum (NR-U) system, a universal mobile telecommunication system (UMTS), wireless local area networks (WLAN), wireless fidelity (WiFi), or a 5G system.

The terminal device may refer to a user equipment (UE), an access terminal, a subscriber unit, a subscriber station, a mobile station, a remote station, a remote terminal, a mobile device, a user terminal, a terminal, a wireless communication device, a user agent, or a user device. The terminal device may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in a 5G network, a terminal device in a future evolved public land mobile network (PLMN), etc.

The network device may be, for example, a base transceiver station (BTS) in the GSM or in the CDMA system, or may be a NodeB (NB) in the WCDMA system, or may be an evolutional Node B (eNB or eNodeB) in the LTE system, or may be a radio controller in a cloud radio access network (CRAN). Alternatively, the network device may be a relay station, an access point, an in-vehicle device, a wearable device, a further network-side device, or a network device in the future evolved PLMN.

Figure 1:
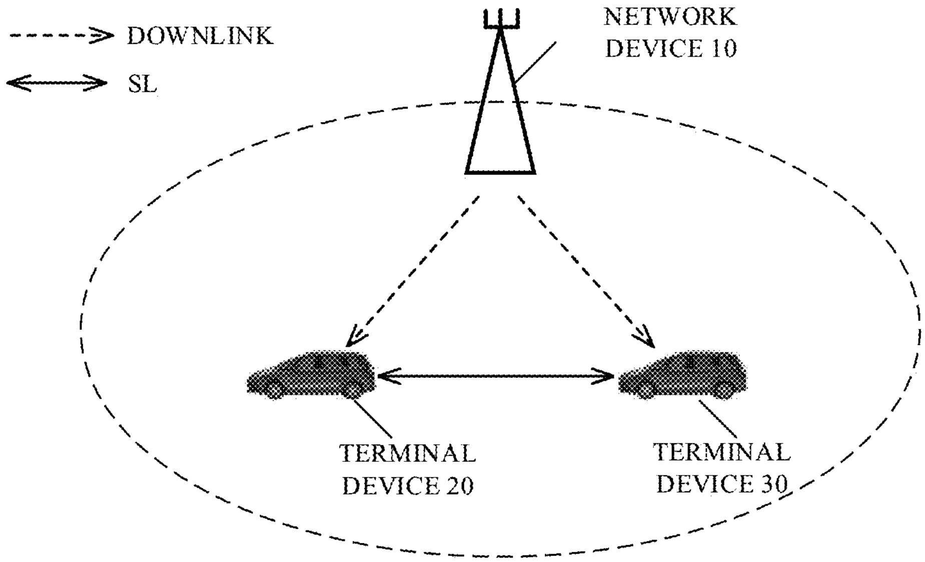
FIG. 1 is a schematic architectural diagram illustrating an application scenario according to implementations.
Figure 2:
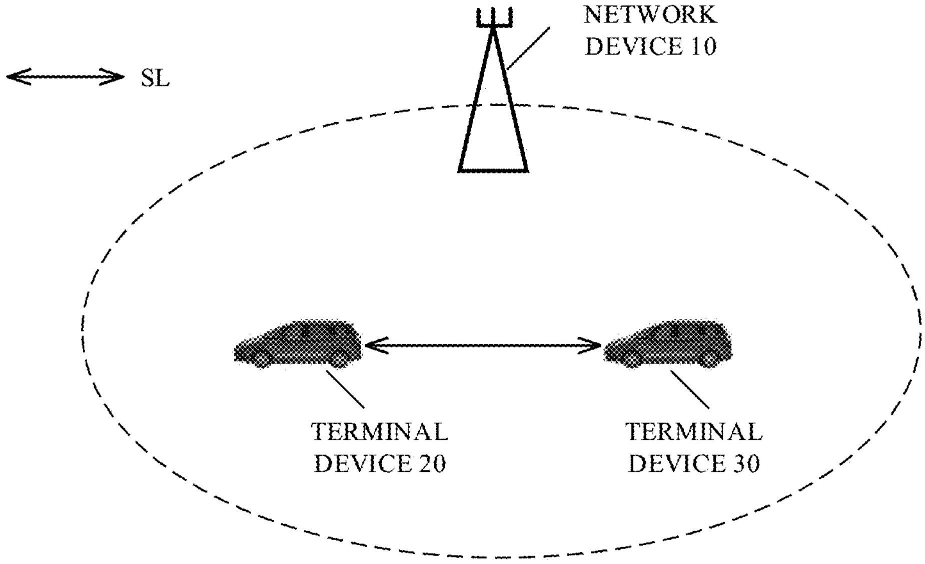
FIG. 2 is a schematic architectural diagram illustrating an application scenario according to other implementations.

FIG. 1 and FIG. 2 are schematic diagrams illustrating application scenarios of implementations. FIG. 1 and FIG. 2 exemplarily illustrates one network device and two terminal devices respectively. A wireless communication system may also include multiple network devices, and there can be other numbers of terminal devices in a coverage area of each of the network devices, which is not limited herein.

In addition, the wireless communication system may further include a mobile management entity (MME), or other network entities such as a serving gateway (S-GW) or a packet data network gateway (P-GW), which is not limited herein.

Terminal device 20 and terminal device 30 can communicate with each other through D2D communication. During D2D communication, terminal device 20 and terminal device 30 directly communicate with each other through an SL. For example, as illustrated in FIG. 1 or FIG. 2, terminal device 20 and terminal device 30 directly communicate with each other through an SL. As illustrated in FIG. 1, terminal device 20 and terminal device 30 communicate with each other through an SL, in which a transmission resource is allocated by a network device. As illustrated in FIG. 2, terminal device 20 and terminal device 30 communicate with each other through an SL, in which a transmission resource is selected by terminal device 20 and terminal device 30 instead of being allocated by the network device.

D2D includes research on proximity based service (ProSe), vehicle to everything (V2X), further enhancements to LTE D2D (FeD2D), and the like. V2X includes vehicle to vehicle (V2V) communication or V2X communication. In V2X communication, X may generally refer to any device with wireless receiving and transmitting capabilities, for example (but not limited to), a wireless device that moves slowly, a vehicle-mounted device that moves quickly, a network control node with wireless transmitting and receiving capabilities, or the like. It should be understood that implementations herein are mainly applied to a V2X communication scenario, but it can also be applied to any other D2D communication scenario, which is not limited herein.

In a cellular system, when data is transmitted between the terminal device and the network device, the terminal device needs to maintain connection with the network device. The network device periodically transmits a reference signal, and the terminal device determines the wireless link quality by detecting the reference signal, so as to determine whether the wireless link is in an in-sync state or an out-of-sync state. If the wireless link is in the in-sync state, then the terminal device can receive data transmitted by the network device. On the other hand, if the wireless link is in the out-of-sync state, the terminal device will be unable to receive the data from the terminal device, and the terminal device needs to be reconnected.

In NR-V2X, the reference signal may be transmitted non-periodically, and the resources for the terminal device to transmit the reference signal need to be obtained through competition, which leads to uncertainty in the transmission of the reference signal and affects the terminal device's measurement of the reference signal, so it is impossible to obtain the quality of the SL accurately.

Disclosed herein are implementations of methods and devices for sidelink (SL) monitoring, which can effectively monitor the link quality of the side link.

Figure 3:
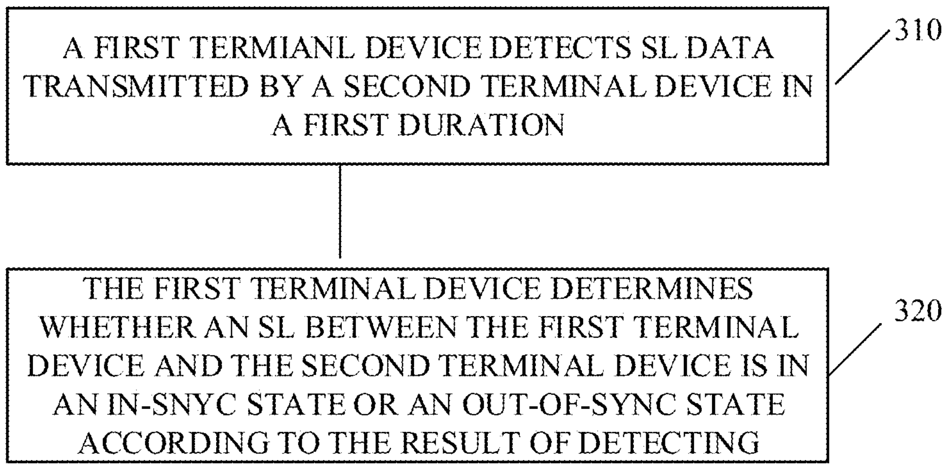
FIG. 3 is a schematic flowchart illustrating a method for SL monitoring according to implementations.

FIG. 3 is a schematic flowchart illustrating a method for SL monitoring. The method can be implemented by a first terminal device and/or a second terminal device. The first terminal device can be terminal device 20 illustrated in FIG. 1 or FIG. 2. The second terminal device can be terminal device 30 illustrated in FIG. 1 or FIG. 2. As illustrated in FIG. 3, the method 300 includes part or all of the operations given below.

At block 310, the first terminal device detects SL data transmitted by a second terminal device in a first duration.

The SL data includes a reference signal and/or a SL control channel. Alternatively, the SL data includes hybrid automatic repeat request (HARQ) feedback information.

At block 320, the first terminal device determines, according to a result of the detecting performed at block 310, whether a SL between the first terminal device and the second terminal device is in an in-sync state or an out-of-sync state.

Here, the "result of the detecting" refers to whether detection on the SL data in the first duration is succeed or not. For example, whether the SL data is detected successfully in the first duration, the number of times or probability of successfully detecting the SL data in the first time duration, or the number of times or probability that the SL data is not successfully detected in the first time duration.

In this implementation, the first terminal device detects the SL data transmitted by the second terminal device in the first duration, and determines, according to the result of the detecting, whether the SL between the first terminal device and the second terminal device is in an in-sync state or an out-of-sync state, thus, effective monitoring of the SL can be realized, and the technical solution provided herein is applicable various scenarios such as periodic reference signals, aperiodic reference signals, or other scenarios supporting feedback transmission.

The reference signal is not particularly limited. For example, the reference signal can be a channel state information-reference signal (CSI-RS) or a demodulation reference signal (DMRS).

The SL control channel can be used to schedule a SL data channel and/or a reference signal. For example, the SL control channel carries indication information indicative of a time-frequency resource for the reference signal, and/or indication information indicative of whether the reference signal is transmitted simultaneously with the SL control channel or the SL data channel.

For example, the second terminal device indicates to the first terminal device through sidelink control information (SCI) that CSI-RS is carried in a physical sidelink control channel (PSCCH) as well as the time-frequency resource of the CSI-RS.

If the reference signal is transmitted simultaneously with the SL data channel, the reference signal can occupy one symbol in the SL data channel. The time-frequency resource occupied by the reference signal can be indicated through SCI, preconfigured such as specified in a protocol, or configured for the terminal device by the network device and informed to the terminal device through configuration information. If the reference signal is not transmitted simultaneously with the SL data channel or the SL control channel, the reference signal can occupy a specific signal in a time slot, such as the second-to-last symbol in the time slot.

Figure 4:
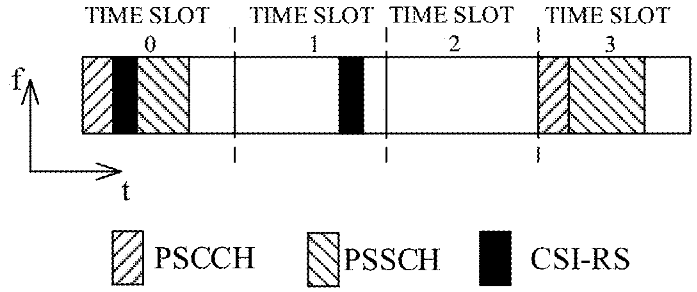
FIG. 4 is a schematic diagram illustrating reference signal transmission according to implementations.

As illustrated in FIG. 4, in time slot 0, the CSI-RS is transmitted together with the PSSCH. A physical sidelink control channel (PSCCH) can schedule the PSSCH and carries indication information for indicating that the CSI-RS is carried in the PSSCH. Further, the time-domain resource occupied by the CSI-RS can be indicated through the PSCCH, the frequency domain resource of the CSI-RS is the same as that of the PSSCH.

In time slot 1, the CSI-RS is transmitted separately. No PSCCH is transmitted in time slot 1. If the terminal device needs to transmit the CSI-RS in time slot 1, the terminal device transmits the CSI-RS in the second-to-last symbol in time slot 1.

Alternatively, the PSCCH can indicate that the CSI-RS is not transmitted together with the PSSCH. For example, in time slot 1 illustrated in FIG. 4, the CSI-RS is transmitted in time slot 1 separately rather than transmitted together with the PSSCH. Here, the terminal device can also transmit the PSCCH in time slot 1, where the PSCCH is used to indicate whether there is a CSI-RS in time slot 1 as well as the time-frequency resource in time slot 1 for transmitting the CSI-RS.

In time slot 3, no CSI-RS is transmitted and PSCCH schedules only the transmission of PSSCH.

Whether the SL is in the an in-sync state or the out-of-sync state can be determined in the following manners.

Manner 1

Figure 5:
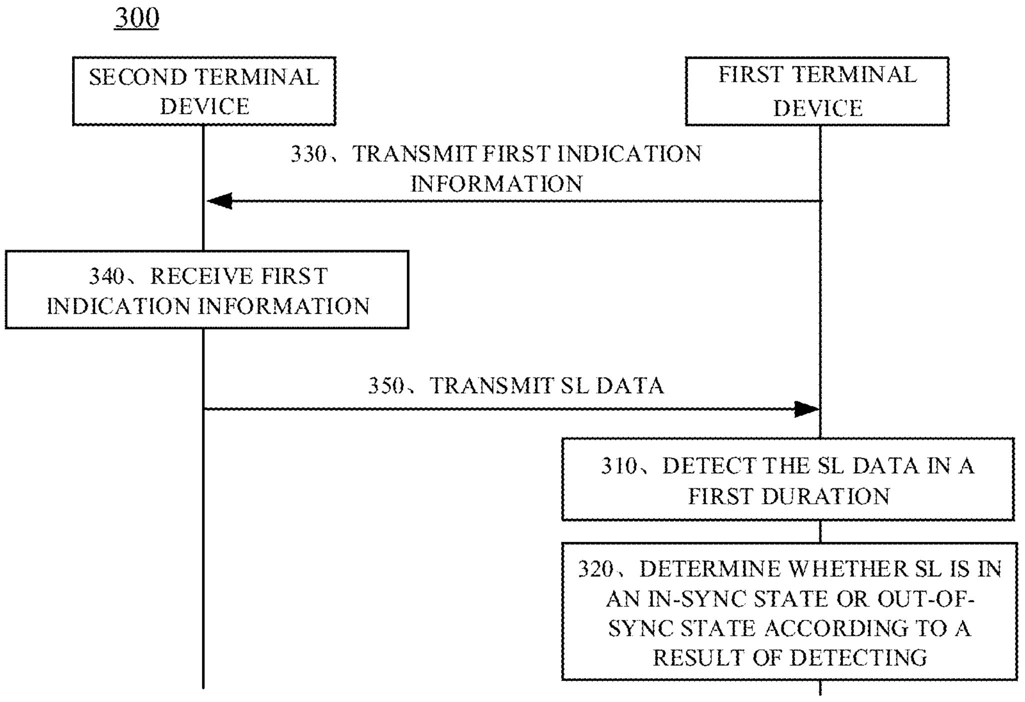
FIG. 5 illustrates a possible implementation based on the method of FIG. 3.

As illustrated in FIG. 5, before operations at block 310, the method includes part or all of the following operations.

At block 330, the first terminal device transmits first indication information to the second terminal device.

The first indication information can be carried in a SL control channel, a SL data channel, or SL radio resource control (RRC) signaling.

At block 340, the second terminal device receives the first indication information from the first terminal device. The first indication information is for indicating the second terminal device to send the SL data to the first terminal device.

At block 350, the second terminal device transmits the SL data to the first terminal device according to the first indication information.

The SL data includes a reference signal and/or a SL control channel for example.

Optionally, operations at block 320 includes operations at block 321 and/or operations at block 322.

At block 321, the first terminal device determines that the SL is in the out-of-sync state if no SL data is detected by the first terminal device in the first duration.

At block 322, the terminal device determines whether the SL is in the in-sync state or the out-of-sync state according to a measurement result of the reference signal, if the SL data is detected by the first terminal device in the first duration.

That is to say, after indicating the second terminal device to transmit the SL data to the first terminal device, the first terminal device detects the SL data in the first duration, if no SL data is detected, the first terminal device determines that the current SL in in the out-of-sync state; on the other hand, if the SL data is detected, then the terminal device determines whether the SL is in the in-sync state or the out-of-sync state according to the measurement result of the reference signal.

If the SL data transmitted by the second terminal device is not received by the first terminal device in the first duration, there are two possible situations. The first possible situation is, due to the non-periodic transmission of the SL data, the second terminal device does not transmit the SL data to the first terminal device in the first duration and therefore, the first terminal device cannot detect the SL data from the second terminal device, this however does not mean that the SL between the first terminal device and the second terminal device has poor quality. The other possible situation is, the second terminal device has transmitted the SL data to the first terminal device, but the first terminal device fails to detect the SL data due to poor SL quality. If no SL data is detected, the first terminal device is unable to determine which situation has occurred and is unable to determine the quality of the SL between the first terminal device and the second terminal device.

In implementations of the disclosure, the first terminal device sends first indication information to the second terminal device to instruct the second terminal device to transmit SL data to the first terminal device. Since the first terminal device has instructed the second terminal device to transmit the SL data to the first terminal device, the second terminal device will transmit the SL data to the first terminal device after receiving the first indication information. If the SL between the first terminal device and the second terminal device is good in quality, the SL data will be successfully detected by the first terminal device; on the other hand, if the first terminal device fails to detect the SL data, it indicates that the SL between the first terminal device and the second terminal device is poor in quality. As such, the first terminal device can determine which situation has occurred and can further determine the quality of the current SL between the first terminal device and the second terminal device.

In operations at block 321 and block 322, the first terminal device can determine that the SL is in the out-of-sync state according to one detecting result of the SL data in the first duration. The disclosure is not limited thereto. The first terminal device can also determine whether the SL is in the out-of-sync state or the in-sync state according to multiple detecting results. For example, if the first terminal device fails to detect the SL data in the first duration for successive N times, the first terminal device can determine that the SL between the first terminal device and the second terminal device is in the out-of-sync state. Still another example, if the first terminal device successfully detects the SL data in the first duration for successive M times, the first terminal device can determine that the SL between the first terminal device and the second terminal device is in the in-sync state.

At block 322, the first terminal device can determine whether the SL between the first terminal device and the second terminal device is in the in-sync state or the out-of-sync state according to one measurement result of the reference signal in the first duration. However, the disclosure is not limited thereto. For example, if the measurement result of the reference signal is less than a threshold value in the first duration for successive P times, the first terminal device can determine that the SL is in the out-of-sync state. Still another example, if the measurement result of the reference signal is greater than a threshold value in the first duration for successive Q times, the first terminal device can determine that the SL is in the in-sync state.

M, N, P, and Q are positive integers and can be configured by the network device or preconfigured.

The first indication information can further indicate the first duration, that is, instruct the second terminal device to transmit the SL data to the first terminal device in the first duration.

Alternatively, the first duration may also be configured for the terminal device by the network device, or can be preconfigured such as specified in a protocol.

The first indication information can indicate the time-frequency resource and/or transmission parameter of the SL data.

The first indication information can indicate the time-frequency resource of the SL data explicitly or implicitly. That is, the first indication information can indicate the time-frequency resource used by the reference signal explicitly. Alternatively, the first indication information can indicate the time-frequency resource implicitly, such as indicating a time domain resource range, and the second terminal device can select a resource for transmitting the SL data from the time-domain resource range. The transmission parameter includes parameters such as the transmission power of the reference signal.

At block 322, the first terminal device can determine whether the SL between the first terminal device and the second terminal device is in the in-sync state or the out-of-sync state according to at least one of signal to interference plus noise ratio (SINR), reference signal received power (RSRP), or reference signal received quality (RSRQ).

Take SINR as an example. If the SCI is detected by the first terminal device successfully in the first duration and the SCI indicates that the PSSCH carries CSI-RS, the first terminal device measures the SINR of the CSI-RS according to the indication of the SCI.

The first terminal device compares the measured value of the SINR with a threshold value to determine whether the SL between the first terminal device and the second terminal device is in the in-sync state or the out-of-sync state. For example, if the measured value of the SINR is greater than the threshold value, the first terminal device determines that the SL is in the in-sync state. On the other hand, if the measured value of the SINR is less than or equal to the threshold value, the first terminal device determines that the SL is in the out-of-sync state.

The first terminal device can determine the probability of successful or failed detection of PSCCH, according to the measured value of the SINR as well as a correspondence relationship between the SINR and the probability of PSCCH detection. The first terminal device compares the probability of successful or failed detection of PSCCH with a threshold value to determine whether the SL between the first terminal device and the second terminal device is in the in-sync state or the out-of-sync state. For example, the first terminal device can determine that the SL is in the out-of-sync state if the probability of failed detection of PSCCH is greater than a threshold value such as 10%. Still another example, the first terminal device can determine that the SL is in the in-sync state if the probability of failed detection of PSCCH is less than a threshold value such as 2%.

For a radio link, measurement on the reference signal is also referred to as radio link monitoring (RLM) measurement.

Figure 6:
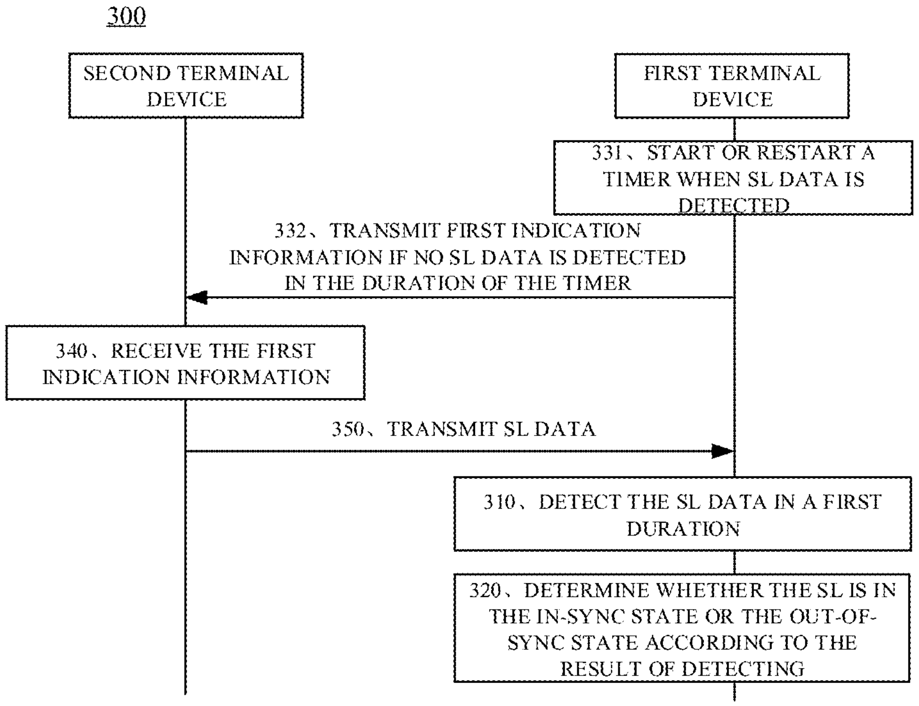
FIG. 6 illustrates a possible implementation based on the method of FIG. 5.

As illustrated in FIG. 6, operations at block 330 may include operations at block 331 and operations at block 332.

At block 331, the first terminal device starts a timer when SL data is detected.

At block 332, the first terminal device transmits the first indication information to the second terminal device when the timer expires if no SL data is detected.

The duration of the timer can be configured for the terminal device by the network device, or can be preconfigured such as specified in a protocol.

Transmission of the first indication information to the second terminal device is triggered by the timer. When the timer expires, the first terminal device transmits the first indication information to the second terminal device. The first terminal device will start or restart the timer when SL data such as PSCCH or a reference signal is detected, and will continue to detect SL data in the duration of the timer. If the first terminal device fails to detect the SL data transmitted by the second terminal device in the duration of the timer, that is, the first terminal device fails to detect the SL data transmitted by the second terminal device again before the timer expires, then the first terminal device transmits the first indication information to the second terminal device when the time expires to instruct the second terminal device to transmit the SL data to the first terminal device.

If no SL data transmitted by the second terminal device is detected by the first terminal device in a first duration after transmitting the first indication information, the first terminal device determines that the SL between the first terminal device and the second terminal device is in the out-of-sync state. On the other hand, if the SL data transmitted by the second terminal device is detected by the first terminal device in the first duration, the first terminal device measures the reference signal and restarts the timer, and determines whether the SL is in the in-sync state or the out-of-sync state according to the measurement result of the reference signal.

Figure 7:
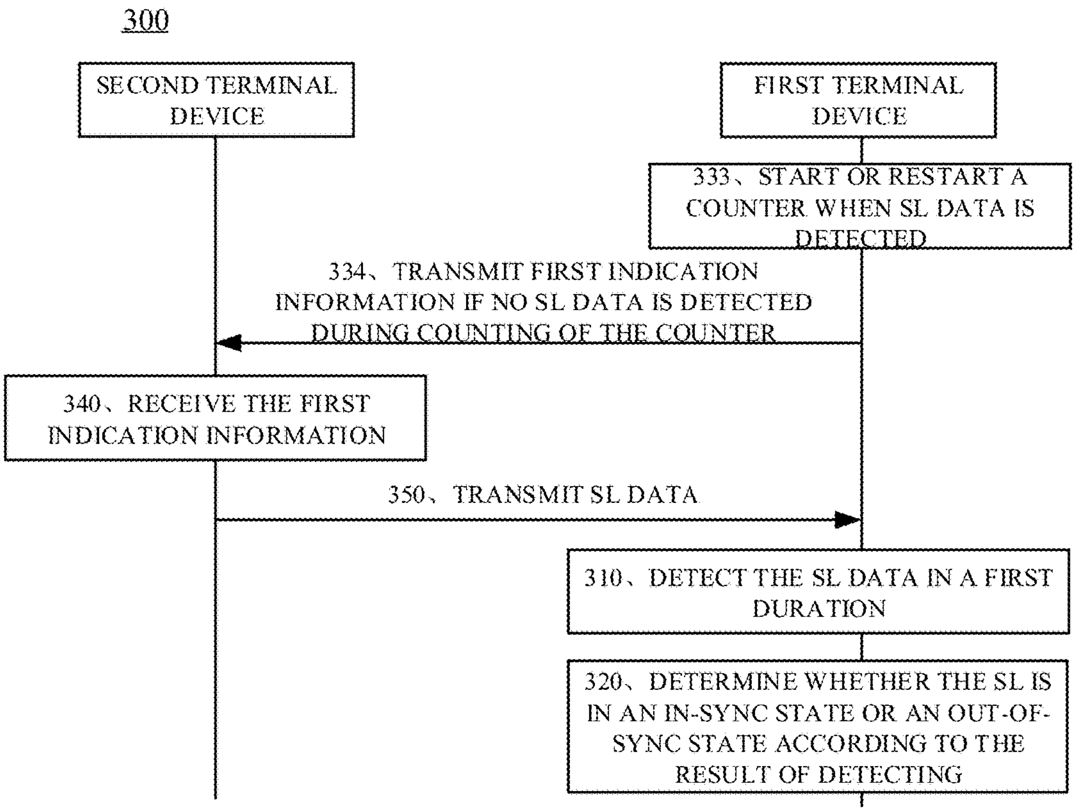
FIG. 7 illustrates a possible implementation based on the method of FIG. 5.

As illustrated in FIG. 7, operations at block 330 include operations at block 333 and operations at block 334.

At block 333, the first terminal device starts a counter when the SL data is detected, and the counter is configured to record the number of time units elapsed.

At block 334, the first terminal device transmits the first indication information to the second terminal device if no SL data is detected before the value of the counter reaches a preset value.

The preset value of the counter can be configured by the network device for the terminal device, or can be preconfigured such as specified in a protocol.

The time unit can be a time slot or a sub-frame.

Transmission of the first indication information to the second terminal device is triggered by the counter. The first terminal device transmits the first indication information to the second terminal device when the value of the counter reaches a preset value. The first terminal device may start or restart the counter when SL data such as PSCCH or a reference signal is detected, and continue to detect SL data transmitted by the second terminal device. The counter is used to record the number of time units elapsed. If no SL data transmitted by the second terminal device is detected by the first terminal device during the counter counting, that is, no SL data transmitted by the second terminal is detected by the first terminal device before the value of the counter reaches the preset value, the first terminal device transmits the first indication information to the second terminal device when the counter stops counting, to instruct the second terminal device to transmit the SL data to the first terminal device.

If no SL data transmitted by the second terminal device is detected by the first terminal device in a first duration after the first indication information is transmitted, the first terminal device determines that the SL between the first terminal device and the second terminal device is in the out-of-sync state. On the other hand, if the SL data transmitted by the second terminal device is detected by the first terminal device in the first duration, the first terminal device measures the reference signal and restarts the counter, and determines whether the SL is in the in-sync state or the out-of-sync state according to a measurement result of the reference signal.

The time unit is a time unit from a specific resource pool, or a time unit from any resource poll configured by the network device.

For example, two resource pools are configured by the network device, that is, resource pool 1 and resource pool 2. Resource pool 1 includes times slots with an even ID, such as time slot 0, time slot 2, time slot 4, time slot 6, time slot 8 and the like. Resource pool 2 includes time slots with an odd ID, such as time slot 1, time slot 3, time slot 5, time slot 7, and time slot 9. If unicast transmission of the first terminal device and the second terminal device takes place in resource pool 1, the counter can count time slots such as time slot 0, time slot 2, time slot 4, time slot 6, time slot 8 and the like in resource pool 1. Alternatively, the counter can also count times slots such as time slot 0, time slot 1, time slot 2, time slot 3, time slot 4, time slot 5, time slot 6, time slot 7, time slot 8, time slot 9 and the like in resource pool 1 and resource pool 2.

The counter can count each time unit along a timeline.

After determining whether the SL is in the in-sync state or the out-of-sync state, the first terminal device can transmit second indication information to the second terminal device. The second indication information is used for indicating whether the SL is in the in-sync state or the out-of-sync state.

Optionally, the method further includes the following. If no SL data is detected by the first terminal device in the first duration, the first terminal device can increase transmission power to transmit SL data to the second terminal device.

Similarly, if the first terminal device transmits the second indication information to the second terminal device and the second indication information indicates that the SL between the first terminal device and the second terminal device is in the out-of-sync state, the second terminal device can increase power for SL data transmission to the first terminal device.

For example, the first terminal device or the second terminal device can increase the transmission power gradually to transmit SL data, until the transmission power reaches the maximum transmission power of the terminal device or the maximum transmission power of the terminal device configured by the network device; alternatively, the first terminal device or the second terminal device can stop increasing the transmission power when the SL data is successfully detected by the other party.

Manner 2

For SL data transmitted periodically, optionally, at block 320, the first terminal device determines whether the SL between the first terminal device and the second terminal device is in the in-sync state or the out-of-sync state according to a probability of detection of the SL data in the first duration.

The SL data includes the reference signal and/or the SL control channel.

The probability of detection may be a probability that the SL data is detected in the first duration and/or a probability that the SL data fails to be detected in the first duration. The probability that the SL data is detected in the first duration is equal to the ratio between the number of times that the SL data is actually detected by the first terminal device in the first duration and the number of times that the SL data is expected to be received by the first terminal device in the first duration. The probability that the SL data fails to be detected in the first duration is equal to the ratio between the number of times that the SL data is not detected by the first terminal device in the first duration and the number of times that the SL data is expected to be received by the first terminal device in the first duration.

The first terminal device can determine whether the SL is in the in-sync state or the out-of-sync state according to whether the probability of detection reaches a first threshold. For example, if the probability of failed detection of the SL control channel is greater than the first threshold, the first terminal device determines that the SL between the first terminal device and the second terminal device is in the out-of-sync state.

The first threshold can be configured for the terminal device by the network device, or preconfigured such as specified in the protocol.

As such, the first terminal device can determine whether the SL between the first terminal device and the second terminal device is in the in-sync state or the out-of-sync state according to the probability of detection of the SL data transmitted by the second terminal device in the first duration, therefore realizing effective monitoring of the link quality of the SL.

Optionally, the first terminal device can transmit second indication information to the second terminal device after determining whether the SL is in the in-sync state or the out-of-sync state, and the second indication information is for indicating whether the SL is in the in-sync state or the out-of-sync state.

Optionally, the method further includes the following. If the SL is in the out-of-sync state, the first terminal device can increase transmission power to transmit SL data to the second terminal device.

Similarly, if the first terminal device transmits the second indication information to the second terminal device and the second indication information indicates that the SL between the first terminal device and the second terminal device is in the out-of-sync state, then the second terminal device can increase power for SL data transmission to the first terminal device.

For example, the first terminal device or the second terminal device can increase the transmission power gradually to transmit SL data, until the transmission power reaches the maximum transmission power of the terminal device or the maximum transmission power of the terminal device configured by the network device; alternatively, the first terminal device or the second terminal device can stop increasing the transmission power when the other party detects the SL data.

Manner 3

At block 320, after transmitting the SL data, the first terminal device determines that the SL is in the out-of-sync state if the number of times the discontinuous transmission (DTX) state is continuously detected and/or the number of times the HARQ negative acknowledgement (HARQ-NACK) is continuously received reaches a second threshold.

The SL data includes HARQ feedback information.

After transmitting the SL control channel to the second terminal device, the first terminal device expects to receive HARQ feedback information from the second terminal device, and the first terminal device can learn about the resource with which the second terminal device transmits the HARQ feedback information. If the second terminal device detects the SL control channel transmitted by the first terminal device successfully, then the second terminal device can send HARQ-ACK or HARQ-NACK to the first terminal device according to the result of detection of the SL control channel. If the second terminal device fails to detect the SL control channel, the second terminal device will not send the HARQ feedback information to the first terminal device, and in this case, no HARQ feedback information sent from the second terminal device will be detected by the first terminal device. This is called the DTX state.

If the number of times the DTX state is continuously detected reaches the second threshold, or the number of times the HARQ-NACK feedback is continuously received reaches the second threshold, or both the number of times the DTX state is continuously detected and the number of times the HARQ-NACK feedback is continuously received reach the second threshold, the first terminal device determines that the SL between the first terminal device and the second terminal device is in the out-of-sync state.

The second threshold can be configured for the terminal device by the network device, or can be preconfigured such as specified in the protocol.

As such, the first terminal device can determine whether the SL between the first terminal device and the second terminal device is in the in-sync state or the out-of-sync state according to the HARQ feedback sent by the second terminal device, therefore realizing the effective monitoring of the link quality of the SL.

Optionally, the first terminal device can transmit second indication information to the second terminal device after determining whether the SL is in the in-sync state or the out-of-sync state, and the second indication information is for indicating whether the SL is in the in-sync state or the out-of-sync state.

Optionally, the method further includes the following. If the SL is in the out-of-sync state, the first terminal device or the second terminal device can increase transmission power to transmit SL data.

The first terminal device can increase the transmission power gradually to transmit SL data to the second terminal device, until the transmission power reaches the maximum transmission power of the first terminal device or the maximum transmission power of the first terminal device configured by the network device. The first terminal device can also stop increasing the transmission power when the first terminal device detects the HARQ-ACK sent by the second terminal device.

In the above three manners, the first terminal device already knows that the second terminal device will transmit SL data in the first duration, that is, the first terminal device is expected to detect the SL data transmitted by the second terminal device in the first duration for at least one time. For example, in manner 1, the first terminal device transmits the first indication information to the second terminal device to instruct the second terminal device to transmit SL data such as the reference signal and/or the SL control channel to the first terminal device in the first duration. In manner 2, the second terminal device transmits SL data such as the reference signal and/or the SL control channel to the first terminal device periodically and therefore, the number of times the first terminal device detects the SL data in the first duration will be fixed. In manner 3, after the first terminal device transmits the SL data to the second terminal device, the second terminal device needs to send HARQ feedback information to the first terminal device in the first duration.

In these situations, if the SL between the first terminal device and the second terminal device is good in link quality, the first terminal device will detect the expected SL data successfully in the first duration. On the other hand, if the expected SL data is not detected in the first duration by the first terminal device, or the amount or number of times of SL data detected is not enough, then the first terminal device can determine that the SL has poor link quality.

If the SL is in the in-sync state, it indicates that the SL has good link quality. On the other hand, if the SL is in the out-of-sync state, it indicates that the SL has poor link quality. When the SL is in the in-sync state, SL data transmission will be carried out between the first terminal device and the second terminal device. On the other hand, when the SL is in the out-of-sync state, SL data transmission will not be carried out between the first terminal device and the second terminal device.

When the number of times of continuously determining that the side link is in the out-of-sync state reaches a threshold, it can be determined that radio link failure (RLF) occurs, and reconnection is required.

Various implementations and/or technical features of the various implementations may be implemented in any combination with each other without conflict, and technical solutions thus obtained shall also fall within the protection cope of the disclosure.

In various implementations described herein, the sequence number of each process does not mean an order of execution, and the order of execution of each process should be determined by its function and/or an internal logic and shall not constitute any limitation to the processes.

SL monitoring methods have been described in detail in the foregoing implementations. The following will describe apparatuses/devices of implementations in connection with FIG. 8 to FIG. 12. Technical features described in the foregoing method implementations can be applied to the following apparatus/device implementations.

Figure 8:
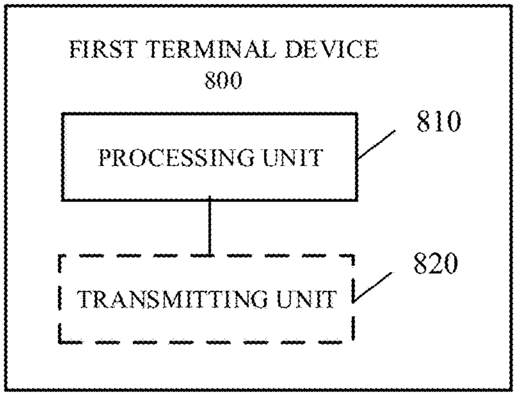
FIG. 8 is a schematic block diagram illustrating a first terminal device according to implementations.

FIG. 8 is a schematic block diagram of a terminal device 800 according to implementations. The terminal device 800 is operable as a first terminal device, the first terminal device 800 includes a processing unit 810. The processing unit 810 is configured to: detect SL data transmitted by a second terminal device in a first duration, where the SL data comprises one of: at least one of a reference signal and a SL control channel, or HARQ feedback information; determine whether a SL between the first terminal device and the second terminal device is in an in-sync state or an out-of-sync state, according to a result of the detecting.

As such, the first terminal device detects the SL data transmitted by the second terminal device in a certain duration, and determines whether the SL between the first terminal device and the second terminal device is in the in-sync state or the out-of-sync state according to the result of detecting, thereby realizing effective monitoring of the link quality of the SL.

In some implementations, the SL data includes the reference signal and/or the SL control channel. The first terminal device further includes a transmitting unit 820. The transmitting unit 820 is configured to transmit first indication information to the second terminal device. The first indication information is used for indicating the second terminal device to transmit the SL data to the first terminal device.

The processing unit 810 is further configured to: determine that the SL is in the out-of-sync state if no SL data is detected by the first terminal device in the first duration; and/or determine whether the SL is in the in-sync state or the out-of-sync state according to a measurement result of the reference signal, if the SL data is detected by the first terminal device in the first duration.

The processing unit 810 is configured to: determine whether the SL is in the in-sync state or the out-of-sync state according to at least one of: SINR, RSRP, and RSRQ.

In some implementations, the first indication information is configured to indicate a time-frequency resource and/or a transmission parameter of the SL data.

In some implementations, the first indication information is carried in a SL control channel, a SL data channel, or RRC signaling.

In some implementations, the processing unit 810 is configured to: start a timer when the SL data is detected. The transmitting unit 820 is further configured to: transmit the first indication information to the second terminal device when the timer expires if no SL data is detected.

In some implementations, the processing unit 810 is configured to: start a counter when the SL data is detected, where the counter is configured to record the number of time units elapsed. The transmitting unit 820 is configured to transmit the first indication information to the second terminal device if no SL data is detected before the value of the counter reaches a preset value.

The time unit is a time unit from a specific resource pool, or a time unit from any resource poll configured by a network device.

The time unit is a time slot or a subframe.

In some implementations, the SL data includes the reference signal and/or the SL control data. The processing unit 810 is configured to: determine whether the SL between the first terminal device and the second terminal device is in the in-sync state or the out-of-sync state, according to a probability of detection of the SL data in the first duration, where the probability of detection includes a probability that the SL data is detected in the first duration and/or a probability that the SL data fails to be detected in the first duration.

In some implementations, the processing unit 810 is configured to: determine whether the SL is in the in-sync state or the out-of-sync state, according to whether the probability of detection reaches a first threshold.

In some implementations, the SL data is periodically transmitted in the first duration.

In some implementations, the SL control channel carries indication information indicative of a time-frequency resource of the reference signal.

In some implementations, the SL control channel is indicative of whether the reference signal is transmitted simultaneously with the SL data channel.

In some implementations, the transmitting unit 820 is configured to: transmit second indication information to the second terminal device, where the second indication information is indicative of whether the SL is in the in-sync state or the out-of-sync state.

In some implementations, the SL data includes HARQ feedback information. The processing unit 810 is configured to: determine that the SL is in the out-of-sync state if the number of times the DTX state is continuously detected and/or the number of times the HARQ-NACK is continuously received reaches a second threshold, after transmitting the SL data.

In some implementations, the transmitting unit 820 is further configured to: perform SL transmission at an increased power when the SL is in the out-of-sync state.

The terminal device 800 can implement operations performed by the first terminal device in the method 300, which will not be repeated herein for the sake of simplicity.

Figure 9:
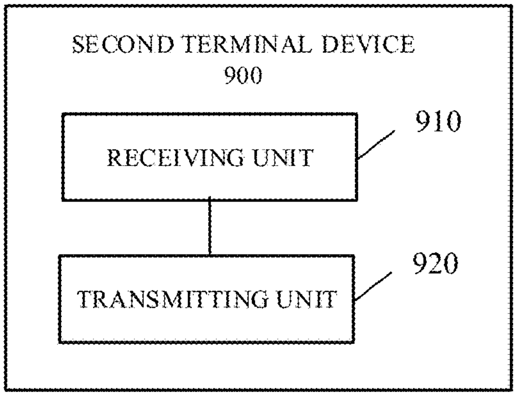
FIG. 9 is a schematic block diagram illustrating a second terminal device according to implementations.

FIG. 9 is a schematic block diagram of a terminal device 900 according to implementations. The terminal device 900 is operable as a second terminal device. The second terminal device includes a receiving unit 910 and a transmitting unit 920.

The receiving unit 910 is configured to receive first indication information transmitted by a first terminal device, the first indication information is used for indicating the second terminal device to transmit SL data to the first terminal device, where the SL data includes at least one of a reference signal and a SL control channel.

The transmitting unit 920 is configured to transmit the SL data to the first terminal device according to the first indication information, where the SL data is used for the first terminal device to determine whether a SL between the first terminal device and the second terminal device is in an in-sync state or an out-of-sync state.

Therefore, if the first terminal device fails to detect the SL data from the second terminal device within a certain duration, the first terminal device can instruct the second terminal device to transmit the SL data to the first terminal device, such that the first terminal device can detect the SL data that is transmitted by the second terminal device based on the first indication information, and can further determine whether the SL between the first terminal device and the second terminal device is in the in-sync state or the out-of-sync state according to the result of detecting, thereby realizing effective monitoring of the link quality of the SL.

In some implementations, the first indication information is indicative of a time-frequency resource and/or a transmission parameter of the SL data.

In some implementations, the first indication information is carried in a SL control channel, a SL data channel, or RRC signaling.

In some implementations, the receiving unit 910 is further configured to receive second indication information transmitted by the first terminal device, the second indication information is indicative of whether the SL is in the in-sync state or the out-of-sync state.

The terminal device 900 can implement operations performed by the second terminal device in the method 300, which will not be repeated herein for the sake of simplicity.

Figure 10:
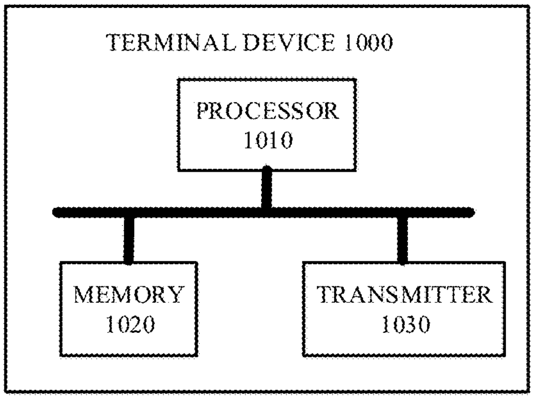
FIG. 10 is a schematic structural diagram illustrating a communication device according to implementations.

FIG. 10 is a schematic structural diagram of a communication device 1000 according to implementations. As illustrated in FIG. 10, the communication device 1000 includes a processor 1010. The processor 1010 can invoke and execute computer programs stored in a memory to perform the method provided herein.

As illustrated in FIG. 10, the communication device 1000 can further include the memory 1020. The processor 1010 can invoke and execute the computer programs stored in the memory 1020 to perform the method provided herein.

The memory 1020 may be a separate device independent of the processor 1010, or may be integrated into the processor 1010.

As illustrated in FIG. 10, the communication device 1000 can further include a transceiver 1030. The processor 1010 can control the transceiver 1030 to communicate with other devices, for example, to send information or data to other devices, or to receive information or data from other devices.

The transceiver 1030 may include a transmitter and a receiver. The transceiver 1030 may further include an antenna, where one or more antenna can be provided.

The communication device 1000 may be the first terminal device of implementations, and the communication device 1000 can implement the operations performed by the first terminal device described in the foregoing method implementations, which will not be repeated herein for the sake of simplicity.

Alternatively, the communication device 1000 may be the second terminal device of implementations, and the communication device 1000 can implement the operations performed by the second terminal device described in the foregoing method implementations, which will not be repeated herein for the sake of simplicity.

Figure 11:
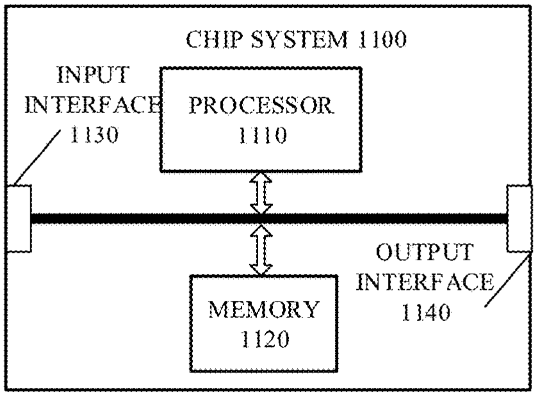
FIG. 11 is a schematic structural diagram illustrating a communication apparatus according to implementations.

FIG. 11 is a schematic structural diagram of a communication apparatus according to implementations. As illustrated in FIG. 11, the communication apparatus 1100 includes a processor 1110. The processor 1110 is configured to invoke and execute computer programs stored in a memory to perform the method provided in implementations. The communication apparatus 1100 can be implemented as a chip or chip system 1100.

As illustrated in FIG. 11, the communication apparatus 1100 further includes a memory 1120. The processor 1110 can invoke and execute the computer programs stored in the memory 1120 to perform the method provided in implementations.

The memory 1120 may be a separate device independent of the processor 1110, or may be integrated into the processor 1110.

The communication apparatus 1100 may further include an input interface 1130. The processor 1110 can control the input interface 1130 to communicate with other devices or chips, for example, to acquire information or data sent by other devices or chips.

The communication apparatus 1100 may further include an output interface 1140. The processor 1110 can control the output interface 1140 to communicate with other devices or chips, for example, to output information or data to other devices or chips.

The communication apparatus 1100 is applicable to the network device of implementations, and the communication apparatus can implement the operations performed by the network device described in the foregoing method implementations, which will not be repeated herein for the sake of simplicity.

Alternatively, the communication apparatus 1100 is applicable to the terminal device of implementations, and the communication device can implement the operations performed by the terminal device described in the foregoing method implementations, which will not be repeated herein for the sake of simplicity.

The communication apparatus 1100 can be a chip.

It should be understood that, the chip herein may also be referred to as a system level chip, a system chip, a system-on-chip (SOC).

The processor referred to herein may be an integrated circuit chip with signal processing capabilities. During implementation, each step of the foregoing method implementations may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or execute the methods, steps, and logic blocks disclosed in implementations. The general purpose processor may be a microprocessor, or the processor may be any conventional processor or the like. The steps of the method disclosed in implementations may be implemented through a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

The memory according to implementations may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (synchlink DRAM, SLDRAM), and a direct rambus RAM (DRRAM).

The above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

Figure 12:
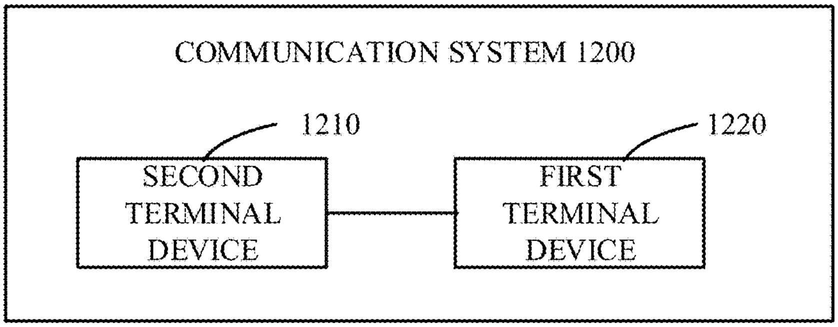
FIG. 12 is a schematic block diagram illustrating a communication system according to implementations.

FIG. 12 is a schematic block diagram of a communication system 1200 according to implementations. As illustrated in FIG. 12, the communication system 1200 includes a second terminal device 1210 and a first terminal device 1220.

The second terminal device 1210 is configured to receive first indication information transmitted by a first terminal device, the first indication information is used for indicating the second terminal device to transmit SL data to the first terminal device, where the SL data includes at least one of a reference signal and a SL control channel. The second terminal device 1210 is further configured to transmit the SL data to the first terminal device according to the first indication information.

The first terminal device 1220 is configured to detect the SL data transmitted by the second terminal device in the first duration, the SL data includes the reference signal and/or SL control channel. The first terminal device determines whether the SL between the first terminal device and the second terminal device is in the in-sync state or the out-of-sync state according to the result of detecting of the SL data.

The second terminal device 1210 can implement operations performed by the second terminal device in the method. The second terminal device 1210 may be structured like the network device 900 illustrated in FIG. 9, which will not be repeated herein for the sake of simplicity.

The first terminal device 1220 can implement operations performed by the first terminal device in the method. The first terminal device 1220 may be structured like the first terminal device 800 illustrated in FIG. 8, which will not be repeated herein for the sake of simplicity.

Implementations further provide a computer readable storage medium. The computer readable storage medium is configured to store computer programs. The computer readable storage medium is applicable to the first terminal device of implementations. The computer programs, when executed, are operable with a computer to implement the operations performed by the first terminal device described in the foregoing method implementations, which will not be repeated herein for the sake of simplicity. Alternatively, the computer readable storage medium is applicable to the second terminal device of implementations. The computer programs, when executed, are operable with a computer to implement the operations performed by the second terminal device described in the foregoing method implementations, which will not be repeated herein for the sake of simplicity.

Implementations further provide a computer program product. The computer program product includes computer program instructions. The computer program product is applicable to the first terminal device of implementations. The computer program instructions, when executed, are operable with a computer to implement the operations performed by the first terminal device described in the foregoing method implementations, which will not be repeated herein for the sake of simplicity. Alternatively, the computer program product is applicable to the second terminal device of implementations. The computer program instructions, when executed, are operable with a computer to implement the operations performed by the second terminal device described in the foregoing method implementations, which will not be repeated herein for the sake of simplicity.

Implementations further provide a computer program. The computer program is applicable to the first terminal device of implementations. The computer program, when executed by a computer, is operable with the computer to implement the operations performed by the first terminal device described in the foregoing method implementations, which will not be repeated herein for the sake of simplicity. Alternatively, the computer program is applicable to the second terminal device of implementations. The computer program, when executed by a computer, is operable with the computer to implement the operations performed by the second terminal device described in the foregoing method implementations, which will not be repeated herein for the sake of simplicity.

The terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In addition, according to implementations, "B corresponding to (which corresponds to) A" means that B is associated with A, and B can be determined according to A. However, "B can be determined according to A" does not mean that B can be determined only according to A, and instead, B can also be determined according to A and/or other information.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

Those of ordinary skill can clearly understand that for the convenience and simplicity of description, the specific working process of the above described systems, devices, and units can refer to the corresponding process in the above method implementation, and will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the integrated units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for sidelink (SL) monitoring, comprising:

detecting, by a first terminal device, hybrid automatic repeat request (HARQ) feedback information transmitted by a second terminal device in a first duration; and determining, by the first terminal device, that a SL between the first terminal device and the second terminal device is in an out-of-sync state when a number of times a discontinuous transmission (DTX) state is continuously detected, wherein the number of times the DTX state being continuously detected corresponds to a number of consecutive absences of HARQ feedback information reception reaching a threshold in the first duration.

2. The method of claim 1, wherein the method further comprises:

transmitting, by the first terminal device, first indication information to the second terminal device, wherein the first indication information is used for indicating the second terminal device to transmit the HARQ feedback information to the first terminal device.

3. The method of claim 2, wherein the first indication information is carried in a SL control channel or a SL data channel.

4. The method of claim 2, wherein transmitting, by the first terminal device, the first indication information to the second terminal device comprises:

starting a timer by the first terminal device when the SL data is detected; and transmitting, by the first terminal device, the first indication information to the second terminal device when the timer expires if no SL data is detected.

5. A terminal device, being a first terminal device and comprising:

a memory configured to store computer programs; and a processor configured to invoke and execute the computer programs stored in the memory to:

detect hybrid automatic repeat request (HARQ) feedback information transmitted by a second terminal device in a first duration, and determine that a SL between the first terminal device and the second terminal device is in an out-of-sync state when a number of times a discontinuous transmission (DTX) state is continuously detected, wherein the number of times the DTX state being continuously detected corresponds to a number of consecutive absences of HARQ feedback information reception reaching a threshold in the first duration.

6. The terminal device of claim 5, wherein the first terminal device further comprises a transmitter, and the processor is configured to invoke and execute the computer programs stored in the memory to make the transmitter:

transmit first indication information to the second terminal device, wherein the first indication information is used for indicating the second terminal device to transmit the HARQ feedback information to the first terminal device.

7. The terminal device of claim 6, wherein the first indication information is carried in a SL control channel or a SL data channel.

8. The terminal device of claim 6, wherein the processor is configured to invoke and execute the computer programs stored in the memory to:

start a timer when the SL data is detected;

the processor is configured to invoke and execute the computer programs stored in the memory to make the transmitter:

transmit the first indication information to the second terminal device when the timer expires if no SL data is detected.

9. A non-transitory computer readable storage medium configured to store computer programs which are operable with a first terminal device to perform:

detecting hybrid automatic repeat request (HARQ) feedback information transmitted by a second terminal device in a first duration; and determining that a SL between the first terminal device and the second terminal device is in an out-of-sync state when a number of times a discontinuous transmission (DTX) state is continuously detected, wherein the number of times the DTX state being continuously detected corresponds to a number of consecutive absences of HARQ feedback information reception reaching a threshold in the first duration.

10. The non-transitory computer readable storage medium of claim 9, wherein the computer programs are operable with the first terminal device to perform:

transmitting first indication information to the second terminal device, wherein the first indication information is used for indicating the second terminal device to transmit the HARQ feedback information to the first terminal device.

11. The non-transitory computer readable storage medium of claim 10, wherein the first indication information is carried in a SL control channel or a SL data channel.

12. The non-transitory computer readable storage medium of claim 10, wherein the computer programs are operable with the first terminal device to perform:

starting a timer when the SL data is detected; and transmitting the first indication information to the second terminal device when the timer expires if no SL data is detected.

13. The method of claim 1, wherein radio link failure (RLF) occurs when a number of consecutive out-of-sync state reaches a second threshold.

14. The method of claim 1, wherein in the DTX state, no HARQ feedback information sent from the second terminal device is detected by the first terminal device.

15. The terminal device of claim 5, wherein in the DTX state, no HARQ feedback information sent from the second terminal device is detected by the first terminal device.

16. The non-transitory computer readable storage medium of claim 9, wherein in the DTX state, no HARQ feedback information sent from the second terminal device is detected by the first terminal device.

* * * * *